W. C. CARLON.
BATTERY INDICATOR.
APPLICATION FILED JULY 28, 1917.

1,338,170. Patented Apr. 27, 1920.

INVENTOR.
William C. Carlon
BY
ATTORNEY.

UNITED STATES PATENT OFFICE.

WILLIAM C. CARLON, OF STOCKTON, CALIFORNIA.

BATTERY-INDICATOR.

1,338,170. Specification of Letters Patent. Patented Apr. 27, 1920.

Application filed July 28, 1917. Serial No. 183,351.

*To all whom it may concern:*

Be it known that I, WILLIAM C. CARLON, a citizen of the United States, residing at Stockton, in the county of San Joaquin, State of California, have invented certain new and useful Improvements in Battery-Indicators; and I do declare the following to be a full, clear, and exact description of the same, reference being had to the accompanying drawings, and to the characters of reference marked thereon, which form a part of this application.

This invention relates to improvements in paraphernalia used in connection with storage batteries used on motor vehicles. The object of this invention is to produce a constant indicator mechanism arranged at or near the driver's seat of the vehicle, whereby the condition of the storage battery can be instantly ascertained by the driver without the necessity of making a personal inspection of the battery itself.

Batteries on motor vehicles are usually placed in more or less isolated, inaccessible parts of the vehicle, rendering it very inconvenient to inspect them. Due to this condition the drivers of the vehicles often neglect the batteries.

By my improved mechanism the driver by simply closing an electric circuit by means positioned on the instrument board of the vehicle, will be apprised as to the voltage of the battery, and also as to whether or not the electrolyte in each cell is below safety level, or whether or not the structure of the cells is broken down.

The advantages of this will be obvious to those skilled in the art.

A further object of the invention is to produce a simple and inexpensive device and yet one which will be exceedingly effective for the purposes for which it is designed. These objects I accomplish by means of such structure and relative arrangement of parts as will fully appear by a perusal of the following specification and claims.

In the drawings similar characters of reference indicate corresponding parts in the several views.

Figure 1:
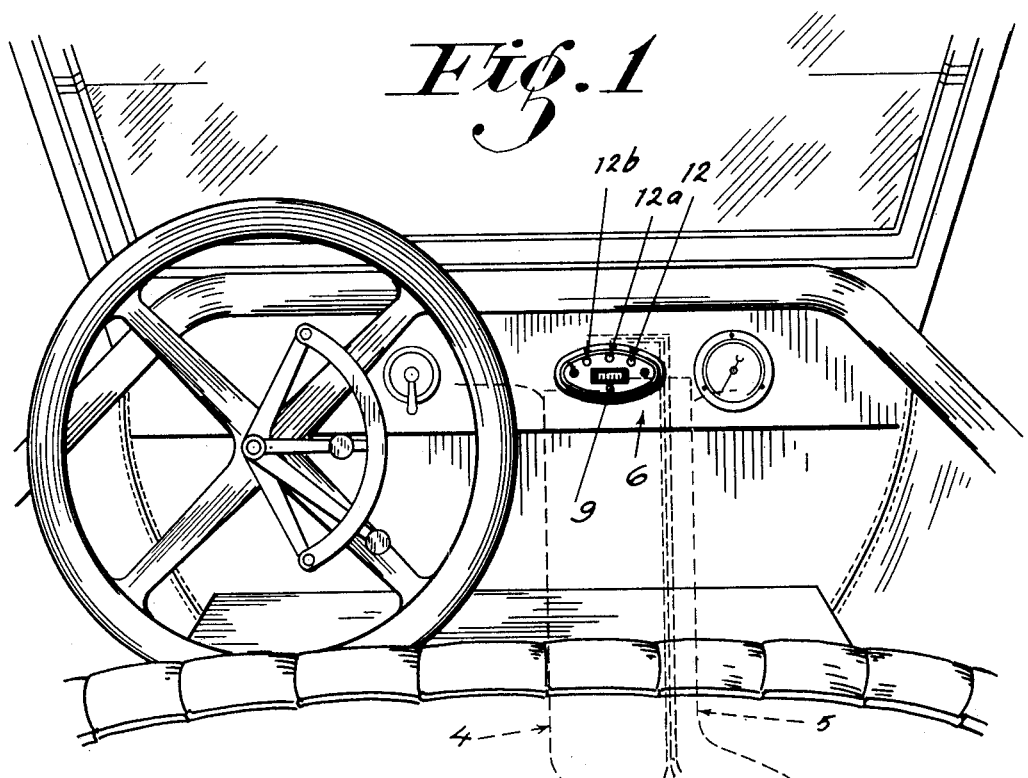
Figure 1 is a perspective view of the instrument board of a motor vehicle showing the position of my improved indicator thereon. In this view the battery and connecting wires are indicated by dotted lines.
Figure 2:
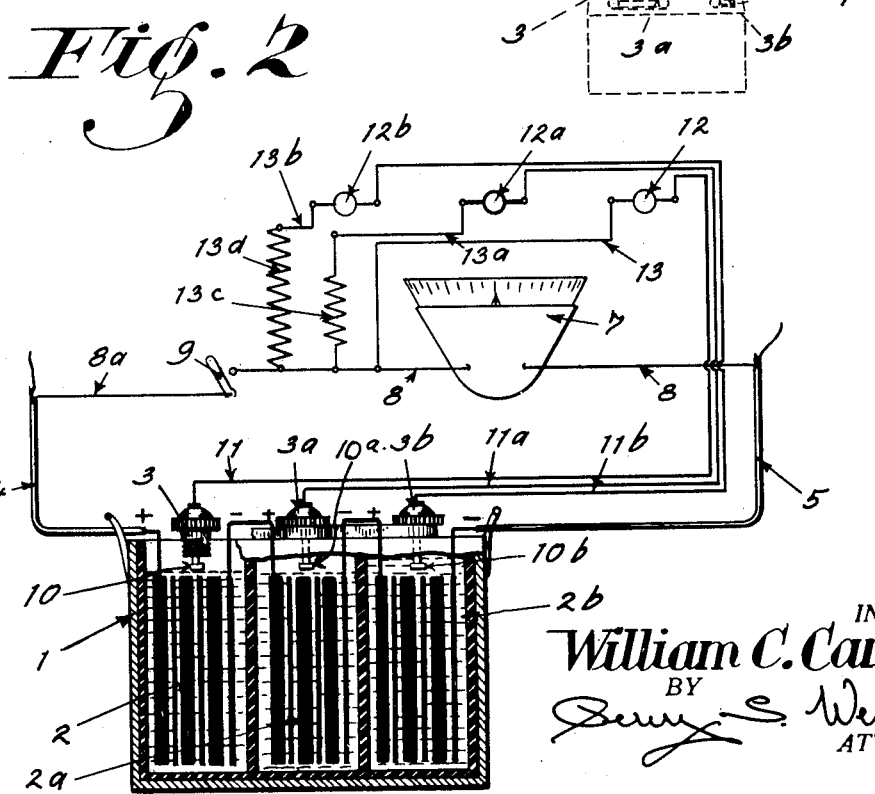
Fig. 2 is a side elevation of a battery, partly broken out and in section to show how my improved indicator is connected therewith, the electric circuits of the indicator being shown diagrammatically in this view.

Referring now more particularly to the characters of reference of the drawings, the numeral 1 designates the battery proper, while numerals 2, $2^a$, and $2^b$ designate the individual cells thereof provided with the usual top caps 3, $3^a$ and $3^b$. These cells are wired in series as is customary with such batteries.

The numeral 4 designates the main service cable leading to the positive electrode of the battery, while numeral 5 designates the cable leading from the negative electrode thereof.

My improved voltmeter 7 is mounted in the instrument board 6 and connection is made between the meter 7, cables 4 and 5 by means of wires 8 and $8^a$, with an intermediate switch 9 which can be a push button or any other desired form of switch for opening or closing the circuit through wires 8 and $8^a$.

My electrolyte and cell gage is constructed and operates as follows:

From each of the caps 3, $3^a$ and $3^b$ I depend a circuit maker comprised of cadmium, these circuit makers being indicated in the drawings by the numerals 10, $10^a$ and $10^b$. With these I connect wires 11, $11^a$ and $11^b$ which extend through the caps 3, $3^a$ and $3^b$ and connect with lamps 12, $12^a$ and $12^b$ respectively. These cadmium circuit makers or poles are normally immersed in the electrolyte of the cells and form negative poles to one of the positive plates of each battery-cell. There being an E. M. F. of from 1.8 to 2.2 volts per cell, a sufficient voltage is normally present to cause the 2. or 2.5 volt lamps to glow when the circuits are closed.

I have used cadmium for these poles as this element has been found by experiment to be very satisfactory for this purpose.

From the lamp 12 a wire 13 leads back and connects with the wire 8. From lamp $12^a$ a wire $13^a$ leads to and connects with the wire 8 and is provided with an intermediate resistance wire $13^c$. Similarly a wire $13^b$ leads from the lamp $12^b$ to the wire 8 and has an intermediate resistance wire $13^d$ of double the resistance of the wire $13^c$. These resistance wires are interposed in the circuits drawing from two and three cells of the battery respectively, so that the current will be equalized to enable the same sized lamps to be used for the entire indicating mechanism.

In batteries of the multiple cell type wired in series, each cell having a normal E. M. F. of two volts or thereabouts, and the flow of current through the wire being from the positive to the negative electrode, the total voltage obtained is the sum of the voltages of the individual cells.

Hence, the E. M. F. from cell 10 will be two volts. That taken from the cells 10 and 10$^a$ wired in series, through the positive electrode 4 and the negative electrode 3$^a$, will be four volts, and from all three cells in series through the positive electrode 4 and the negative electrode 3$^b$ will be six volts.

Therefore, in order to use lamps of the same voltage in all the circuits, a resistance of two ohms must be interposed in the circuit through the wires 4 and 11$^a$, etc., and a resistance of four ohms in the circuit through the wires 4 and 11$^b$, etc.

The electrolyte in each cell being the conductor of electricity therein, it is of course evident that no current will pass from a positive plate to a negative cadmium electrode should the level of the electrolyte fall below such negative electrode, even though there is a sufficient quantity of such electrolyte remaining in the cell to indicate a normal voltage in the voltmeter.

The operation of the device is as follows:

When the operator desires to test the condition of the battery he closes the switch 9. This completes a circuit from the battery through the cable 5, wire 8, meter 7, wire 8, switch 9, wire 8$^a$, cable 4 and back to the battery, whereupon the meter will register the voltage in the battery.

Simultaneously therewith, if the electrolyte level in the cells is proper and the structure of the cells not broken down, the circuit will be completed from the cells through the points 10, 10$^a$ and 10$^b$, wires 11, 11$^a$ and 11$^b$, lamps 12, 12$^a$ and 12$^b$, wires 13, 13$^a$ and 13$^b$, wire 8, switch 9, wire 8$^a$, cable 4 and back to the battery cells. This will light the lamps showing the conditions to be proper.

Should however the electrolyte level fall and move away from contact with either of the points 10, 10$^a$ and 10$^b$ or should the structure of any cell be broken down, no circuit will be made in the corresponding lamp and this will then indicate that the battery needs attention.

When the indicating means is not in use the switch 9 is open which opens all the circuits and leaves the mechanism inactive until it is again called into use.

From the foregoing description it will be readily seen that I have produced such a device as substantially fulfills the object of the invention as set forth herein.

While this specification sets forth in detail the present and preferred construction of the device, still in practice such deviations from such detail may be resorted to as do not form a departure from the spirit of the invention, as defined by the appended claims.

Having thus described my invention what I claim as new and useful and desire to secure by Letters Patent is:

1. The combination with a plurality of storage battery cells connected in series, and a conductor leading from the positive pole of one of the end cells; of an auxiliary electrode in each cell adapted to contact with the electrolyte therein when the same is at its normal level, a lamp for each cell, a wire from each lamp to the conductor, and another wire to the corresponding auxiliary electrode, and a suitable resistance interposed in the lamp wiring for each cell beyond the one from which the conductor extends, whereby lamps of the same voltage may be used for all the cells.

2. The combination with a plurality of storage battery cells connected in series, and a conductor leading from the positive pole of one of the end cells; of an auxiliary electrode in each cell adapted to contact with the electrolyte therein when the same is at its normal level, a lamp for each cell, a wire from each lamp to the conductor, another wire to the corresponding auxiliary electrode, the lamp circuits being normally closed when the electrolyte in the cells is at its desired level, and a common switch interposed in the conductor between the first lamp wire and the cell to break the circuit therethrough at will.

In testimony whereof I affix my signature.

WILLIAM C. CARLON.